United States Patent [19]

Cochran

[11] 3,922,526

[45] Nov. 25, 1975

[54] DRIVER MEANS FOR LSI CALCULATOR TO REDUCE POWER CONSUMPTION

[75] Inventor: Michael J. Cochran, Richardson, Tex.

[73] Assignee: Texas Instruments Incorporated, Dallas, Tex.

[22] Filed: Feb. 2, 1973

[21] Appl. No.: 329,008

[52] U.S. Cl. .............. 235/152; 307/208; 340/172.5

[51] Int. Cl.² ............................................. G06F 1/04

[58] Field of Search ......... 235/152, 156; 340/172.5; 307/208, 269, 296, 296 A; 328/63

[56] References Cited

UNITED STATES PATENTS

| | | | |
|---|---|---|---|
| 3,453,601 | 7/1969 | Bogert et al. | 235/152 X |
| 3,510,689 | 5/1970 | Baker | 307/238 |
| 3,518,635 | 6/1970 | Cole et al. | 307/238 |
| 3,535,560 | 10/1970 | Cliff | 340/172.5 X |
| 3,593,158 | 7/1971 | Day et al. | 307/208 |
| 3,641,328 | 2/1972 | Osborne | 235/156 |
| 3,736,569 | 5/1973 | Bouricivs | 340/172.5 |
| 3,760,171 | 9/1973 | Wang et al. | 235/156 |
| 3,764,823 | 10/1973 | Donofrio et al. | 307/265 X |
| 3,764,942 | 10/1973 | Milne | 340/172.5 |
| 3,819,921 | 6/1974 | Kilby et al. | 235/156 |

*Primary Examiner*—David H. Malzahn
*Attorney, Agent, or Firm*—Harold Levine; Rene Grossman; Thomas G. Devine

[57] ABSTRACT

An MOS integrated circuit electronic calculator is clocked by a sequential tri-frequency signal generator actuable in response to the keyboard signals. The clock generator supplies a first relatively high frequency signal during the relatively short period when the calculator is actually in the calculating mode, a second intermediate frequency for a selected time interval after the calculator has completed actual calculating and is displaying the result, and a third low frequency signal after the selected time interval during which time the calculator is in a quiescent state, neither calculating nor displaying the result but merely internally retaining the previous information. The generator also supplies a strobed $V_{GG}$ signal to the calculator chip in response to a static $V_{GG}$ signal generated by a regulated power supply. Both the power supply and the tri-frequency generator are preferably formed on a single bipolar integrated circuit chip.

10 Claims, 4 Drawing Figures

DRIVER MEANS FOR LSI CALCULATOR TO REDUCE POWER CONSUMPTION

This invention relates to calculators in general, and more particularly to MOS integrated circuit variable function fixed program calculators driven by a tri-frequency clock and strobed $V_{GG}$ signals generated from a single bipolar integrated circuit.

BACKGROUND OF THE INVENTION

Electronic calculators have evolved to the present stage wherein now a calculator system is implemented using only one MOS/LSI chip. Such a system is set forth in detail in copending patent application Ser. No. 163,565, filed July 19, 1971, now abandoned and replaced by continuation application Ser. No. 420,999, filed Dec. 3, 1973 assigned to the assignee of this invention. By implementing necessary memories, registers, arithmetic logic units, and decode circuits all on a single chip, a large savings in manufacturing, and labor and material cost is achieved. Small low cost "pocket sized" personal calculators for the consumer market have been made possible by the availability of "one-chip" MOS/LSI calculator systems. These calculators are usually battery operated, and in order to reduce the cost, size, and operating cost of the calculator, there is a continuing effort to reduce battery drain so fewer and cheaper batteries are needed and time between recharges is prolonged, or else throw-away, non-rechargable batteries may be used. Although great advances were realized in reducing power dissipation by successfully integrating the above-described functions on a single chip, further power reductions were desired so as to optimally prolong life of the actuating battery.

It is therefore a principal object of the present invention to provide a method of operating an MOS/LSI electronic calculator utilizing a strobed $V_{GG}$ drive signal so as to reduce dynamic power dissipation of the MOS chip.

Another feature of the invention is to reduce power dissipation of the MOS chip by providing thereto a three frequency clock signal whose frequency is responsive to the elapsed time subsequent to keyboard actuation.

It is still another object of the present invention to provide a three frequency clock generator on a bipolar integrated circuit chip in an electronic calculator system which provides a clocking signal to the calculator chip whose frequency is responsive to elapsed time subsequent to keyboard actuation.

It is yet another object of the invention to provide a regulated power supply on the same chip in cooperation with the immediately preceding clock generator so as to provide to the calculator MOS chip a strobed $V_{GG}$ signal in time phase with the clock signal.

Briefly and in accordance with the present invention, an MOS integrated circuit electronic calculator is responsive to a three frequency clock signal whose frequency is determined by elapsed time subsequent to keyboard actuation. A first relatively high frequency is generated for a relatively short period upon keyboard actuation while the calculator is in a computing mode. Thereafter a second intermediate frequency is generated for a selected time interval during which time the calculator displays the information. Absent reactuation of the keyboard, a third low frequency clocking signal is generated after the second time interval until battery power to the calculator is removed, i.e., until the "off-on" switch is turned off. During the low frequency period, the calculator neither calculates nor displays information, but merely internally retains the results of calculations or other numbers in its internal registers awaiting future instructions.

In a preferred embodiment of the present invention, a regulated power supply in cooperation with the clock generator provides a strobed $V_{GG}$ (gate voltage supply) drive signal to the calculator chip to minimize power dissipation. The clock generator and regulated voltage generator are advantageously integrated on a single bipolar chip.

Novel features believed to be characteristic of this invention are set forth in the appended claims. The invention itself, however, as well as other objects and advantages thereof, may best be understood by reference to the following detailed description when read in conjunction with the accompanying drawings, wherein:

DETAILED DESCRIPTION OF THE DRAWINGS

Figure 1:
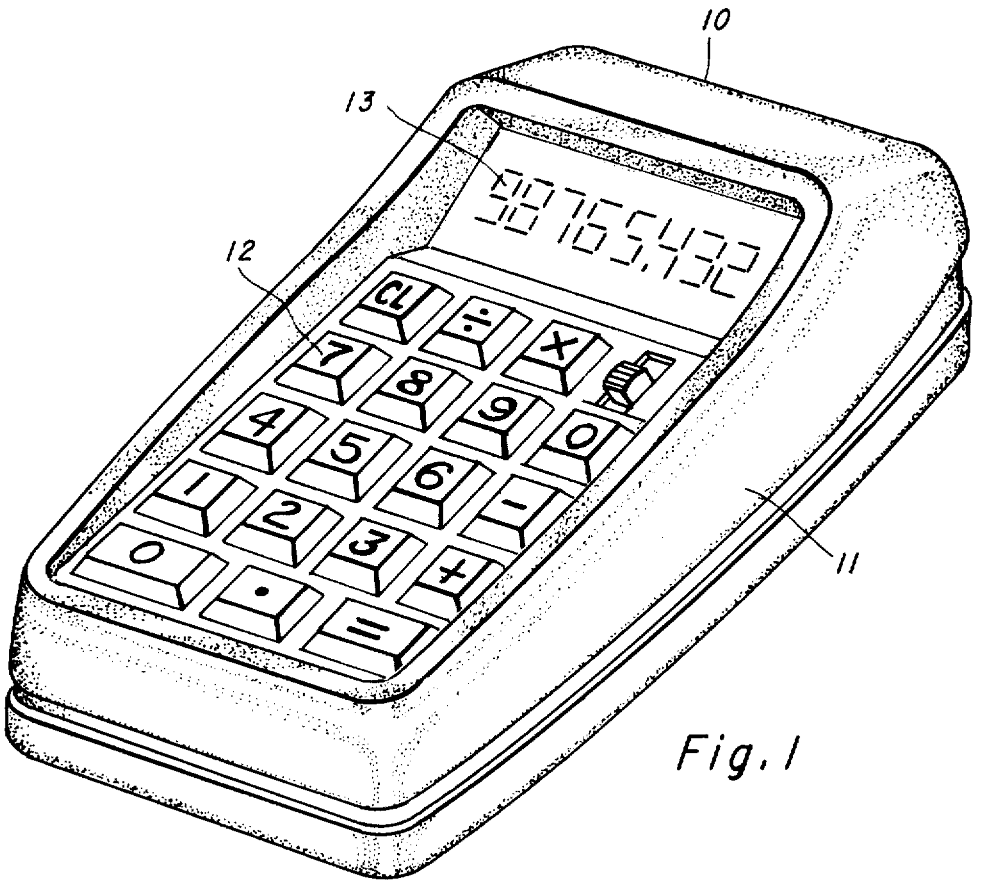
FIG. 1 is a pictorial view of a pocket-size MOS calculator which may utilize the invention.

Referring now to FIG. 1, a portable hand-held electronic calculator 10 of the type which may utilize features of this invention is shown in pictorial form for mere illustrational purposes only. The calculator 10 comprises a housing 11 having a keyboard 12 and a display 13. The display may be provided by NIXIE tubes, liquid crystal display units, arrays of light emitting diodes, or other such display means. The keyboard 12 includes both numbered keys and function keys, depression of which inputs data to the calculator.

Figure 2:
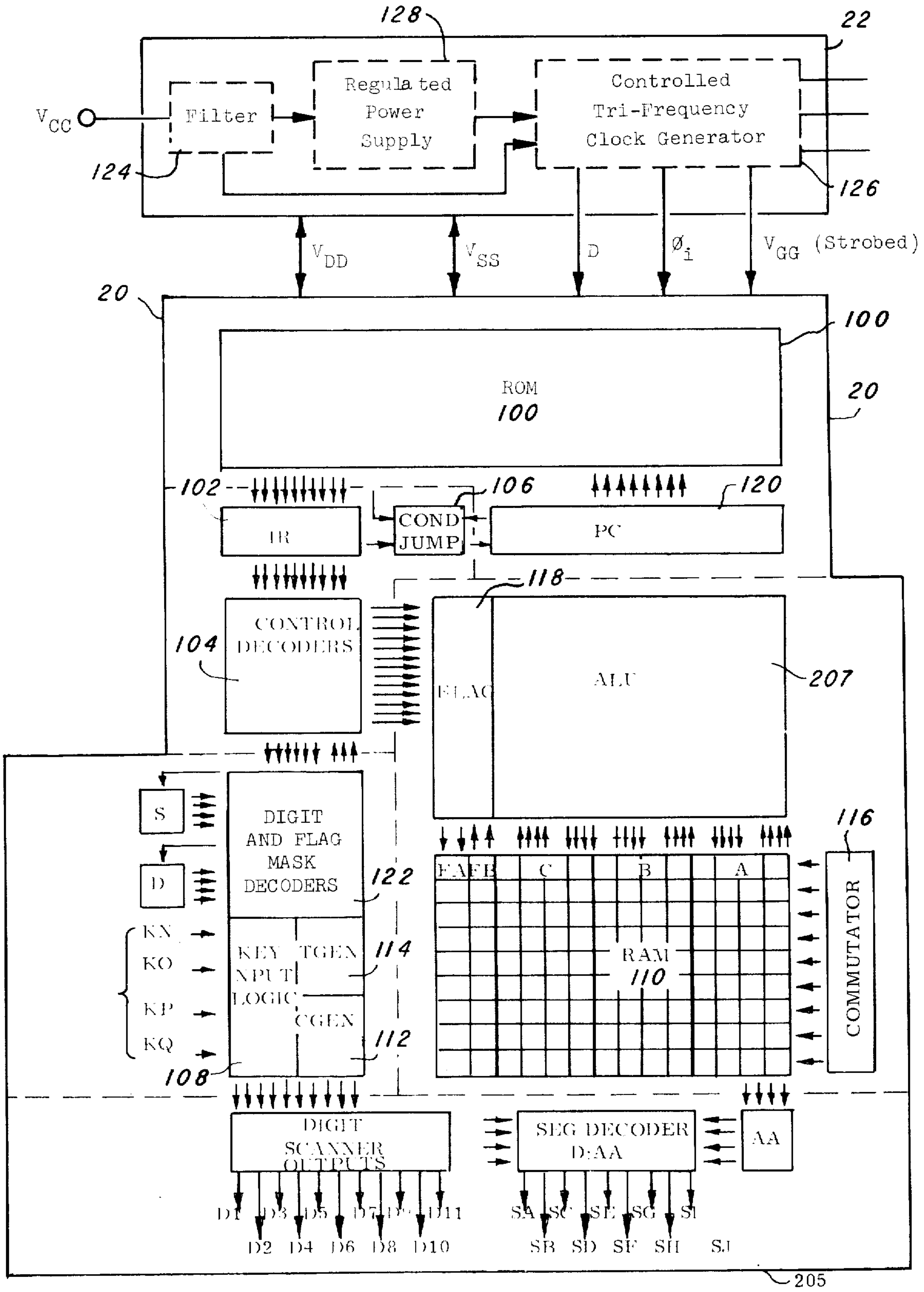
FIG. 2 is a functional block diagram of the calculator system showing the MOS chip in cooperation with the bipolar chip.

Generally the construction and operation of the calculator of this invention may be explained according to the block diagram of FIG. 2, but this diagram is not intended to be structurally definitive.

Depicted in FIG. 2 is the actual calculating means 20 shown in coordination with the driver means 22 of this invention. For purposes of illustration only, the calculating means 20 is depicted as an MOS one-chip calculator system as defined in detail in the above-referenced copending application, VARIABLE FUNCTION PROGRAMMED CALCULATOR. Another example of an MOS calculating system readily modified by one skilled in the art which is suitable as the calculating means 20 is described in detail in copending patent application, ELECTRONIC CALCULATOR, Ser. No. 255,856, now abandoned and replaced by continuation application Ser. No. 360,984, filed May 16, 1973 filed May 22, 1972 and assigned to the assignee of this application.

The MOS one-chip calculating means 20 includes for storing the control program a program memory 100 which suitably is a read-only memory (ROM) comprised of several hundred or more multibit word storage locations. The control program is comprised of instruction words which are read out of the ROM 100 one word at a time into an instruction register 102 for immediately storing the word. Control decoders 104 and jump condition 106 are selectively responsive to the instruction register 102. Control decoders 104 decode and cause execution of the instruction word.

The control decoders 104 are also responsive to instructions entered from the keyboard. Signals KN-KQ represent keyboard commands in response to the particular keyboard entry by the user. The key input logic circuit 108 couples the selective natural number inputs, functional inputs, decimal point information, mode switches including a constant switch, and rounding information to the proper circuits executing the instruction. For example, a KO input may be representative of an addition operation, causing the particular ROM 100 location containing the first instruction word of the "add" subroutine to dump its contents into the instruction register 102. Similarly, the key input logic 108 determines which number is represented on the natural number KN input line and causes that number to be entered into the particular register in the RAM 110. The RAM includes three thirteen digit registers, called A, B and C registers, each four bits per digit in binary coded decimal format. The time mask decoders 122 provide the timing masks such as the exponent mask, display mask, the least and most significant digit mask, and the overflow digit mask. Timing masks are needed because, for example, only eight digits are displayed from thirteen digit registers; the remaining digits are used for exponent, decimal point, etc. Well known programmable logic arrays (PLA's) implement the matrices comprising the various masks.

The clock $\phi_t$ generated in the bipolar chip and supplied to the MOS chip actuates clock generator 112 to which timing generator 114 is responsive. The clock generator produces three clocks, $\phi_1$, $\phi_2$, $\phi_3$. The timing generator 114 produces state or S times and D times, where a state time is the period for one digit to be operated on in the arithmetic unit, and a D time is the period for a word or a set of thirteen digits to be operated on. A state time represents a set of three clocks and defines the time for one digit from each of the registers A, B and C in the RAM 110 to be operated on in parallel by the arithmetic logic unit (ALU) 207. Thirteen state times (S times) represent one D time or instruction cycle wherein all arithmetic operations are performed in one instruction cycle or thirteen S times. The display and the keyboard are both strobed by D times, of which eleven occur in a recurring cycle.

The RAM 110 also includes two flag registers FA and FB and is basically operated as a sequentially addressed RAM in response to the commutator 116. That is, the commutator 116 generates S time signals which sequentially address the cells in the RAM, as set forth in copending patent application, Ser. No. 163,683, now abandoned and replaced by continuation application Ser. No. 458,934, filed Apr. 8, 1974 filed July 19, 1971.

Data stored in the respective registers of the RAM 110 is selectively utilized by the arithmetic logic unit (ALU) 207 which is of the bit parallel, digit serial type. The flag logic 118 functions as a carry/borrow register for the ALU.

The program counter 120 is capable of addressing each of the storage locations in the ROM 20 whereby the instruction word in the respective location is read out into the instruction register 102. In the usual mode of operation, the program counter is incremented by one for each instruction cycle, as controlled by the timing circuitry, so that the instructions of a particular subroutine stored in the ROM are read out in sequence. However, branch or jump instructions stored in the instruction word which appear at the instruction register are recognized by the control decoder 104 and modify the sequencing of the program counter 120. For example, a branch instruction in accordance with the jump condition circuit 106 may cause the program count to jump.

The bipolar driver chip 22 is responsive to an external supply voltage $V_{CC}$, typically at least one dry cell battery supply from 2–6 volts. The driver chip 22 generates from the externally supplied voltage $V_{CC}$ in response to keyboard inputs KN–KQ a $V_{DD}$ voltage, pulsed $V_{GG}$ voltage, a three frequency sequential clock voltage $\phi_t$, and a display disable D voltage.

Driver chip 22 comprises a controlled tri-frequency clock generator 126 which is responsive to a regulated voltage supply and oscillator 128 supplying a regulated switching voltage and is further responsive to filter 124 which includes a voltage doubler for supplying a regulated static $V_{GG}$ voltage to the generator 126.

Figure 3:
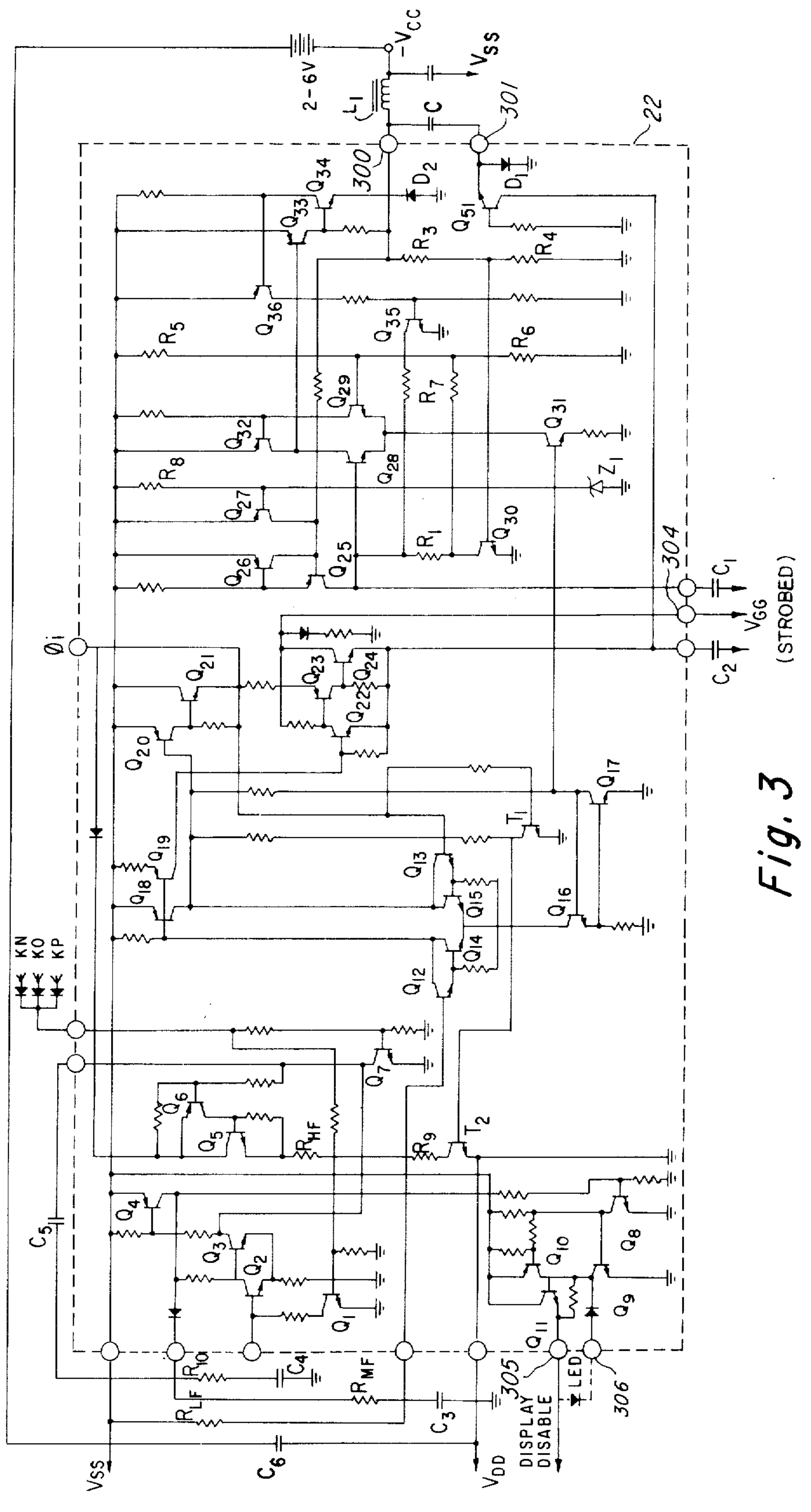
FIG. 3 is a detailed schematic diagram of the three frequency clock generator and regulated power supply depicted in the bipolar chip of FIG. 2.

Referring now to FIG. 3, one implementation of the tri-frequency clock generator 126, regulated voltage supply and oscillator 128 and filter 124 of the bipolar chip 22 is schematically illustrated.

The filter 124 and regulated voltage supply and oscillator 128 in combination comprise a power supply of the type typically referred to as a switching regulator. The switching regulator of this invention is utilized as it provides a higher voltage output ($V_{SS}$–$V_{DD}$) than is supplied as an input ($V_{CC}$). The $V_{SS}$–$V_{DD}$ voltage is then itself doubled to generate $V_{GG}$. Furthermore, a theoretical 100 percent efficiency is realizable which optimally can minimize battery drain. The filter 124 comprises an L–C circuit coupling the $V_{CC}$ input voltage to terminals 300–301. For purposes of this embodiment, $V_{CC}$ may range between 2 volts and 6 volts and is generally supplied by a series of three dry cell batteries. Transistor Q51 and diode D1 along with capacitors C2 and C comprise a voltage doubler which allows a $V_{GG}$ of −7 volts when $V_{SS}$ is set at +7 volts and $V_{DD}$ is ground.

The regulated voltage supply and oscillator 128 comprises switching transistors Q33 and Q34 coupling the filter 124 to differential stage. Differential transistor pair Q28–Q29 provide a differential comparator responsive to the voltage on capacitor C1. When the voltage on C1 is less than the bias voltage on the base of differential transistor Q29, discharge transistor Q30 is biased in the non-conductive state by resistors R3 and R4 in combination with the voltage on terminal 300. Current source transistors Q25 and Q26 charge capacitor C1 at a rate in accordance with the duty cycle desired for the switching regulator. When the voltage on capacitor C1 exceeds the voltage on the base of differential transistor Q29 as set by resistors R5 and R6, differential transistor Q28 becomes conductive. In response thereto, source transistor Q32 conducts causing switching transistors Q33 and Q34 to become conductive. Inductor L1 begins charging which increases the voltage of terminal 300 which changes the bias on discharge transistor Q30 causing it to become conductive. Capacitor C1 then begins to discharge therethrough with resistor R1 controlling the rate thereof. When discharge transistor Q30 becomes conductive, resistor R7 is switched in the threshold circuit of differential transistor Q29 lowering the threshold.

Zener diode Z1, regulator transistor Q27, and resistor R8 provide a regulator circuit so as to maintain $V_{SS}$ voltage on Q25 at a relatively constant level with respect to circuit ground ($V_{DD}$), notwithstanding the $V_{SS}$ tendency to change during the switching cycle.

Current limiting transistors Q35 and Q36 are resistively coupled to capacitor C1 so as to limit the current which is discharged through transistor Q30. That is, if the voltage on the base of transistor Q28 becomes excessive such as to possibly damage transistor Q30, transistor Q35 assists in passing the overcurrent.

Diode D2 is the catching diode common to all switching regulator circuits. That is, when the switching transistors Q33 and Q34 become nonconductive and no longer are charging inductor L1, the voltage polarity of the inductor L1 changes state and the inductor becomes a current source. The $V_{CC}$ voltage to which the inductor is charged upon phase reversal then charges capacitor C6 through circuit ground. Current then flows from $V_{DD}$ (circuit ground) through catching diode D2 back to inductor L1. Accordingly, the voltage across capacitor C6, $V_{DD}$–$V_{SS}$, is approximately two $V_{CC}$'s above circuit ground ($V_{DD}$), as $V_{CAPG} = V_{CC} + V$ inductor.

When the inductor changes polarities, the voltage doubler circuit comprising transistor Q51 and diode D1 doubles the approximately 7 volts to supply a static $V_{GG}$ approximately 14 volts below $V_{SS}$.

To minimize inductor and capacitor values the switching circuit is designed to oscillate at approximately 30 KHz, as earlier noted, by choosing a 50 percent duty cycle for the switching regulator. A 3.5 volt $V_{CC}$ input is efficiently converted to approximately a 7 volt $V_{SS}$–$V_{DD}$.

The controlled tri-frequency clock generator 126 provides a strobed $V_{GG}$ and a clock signal exhibiting three sequential frequencies responsive to keyboard actuation. The generator 126 comprises a comparator circuit controlling a buffered output switch such that the rate of voltage amplitude increase of the compared voltage is one of three rates, causing switching at one of the three predetermined frequencies.

That is, transistors Q12–Q17 comprise a comparator such that when the voltage on the base of Q12 is beneath the threshold voltage as determined on the base of transistor Q13, the output switch comprising transistors Q18–Q20 and Q22 causes the output buffer transistors Q21, Q22, and Q23 to provide a high $\phi_t$ clock signal (approaching $V_{SS}$ amplitude) and a relatively high $V_{GG}$ at terminal 304 somewhat less than voltage $V_{SS}$. That is, referring to FIG. 4, the strobed $V_{GG}$ signal is seen to exhibit a logic high state of amplitude less than the logic high state of the clock $\phi_t$ signal. Such a voltage increment prevents data loss in the calculator.

When $\phi_t$ and $V_{GG}$ are logically high at approximately 7 volts, switch transistor T1 is conducting causing discharge transistor T2 to be non-conducting. Accordingly, $V_{SS}$ is charging capacitor C3 at a rate determined by resistors LF (low frequency), MF (middle frequency) and HF (high frequency). When the voltage on the base of comparator transistor Q12 sufficiently increases due to the charging of capacitor C3 and exceeds the threshold level, comparator transistor Q14 begins to conduct driving switching transistors Q19 and Q22 conductive and buffer transistors Q21 and Q24 non-conductive and conductive respectively. Accordingly, both $\phi_t$ and $V_{GG}$ waveforms fall from a relatively high +7 volts to a relatively low −7 volts.

When $\phi_t$ goes to the relatively low voltage, switch transistor T1 is driven non-conductive and discharge transistor T2 is driven conductive and capacitor C3 begins to discharge therethrough at a rate determined by resistor R9. When the base voltage of comparator transistor Q12 falls beneath the threshold level, $\phi_t$ and $V_{GG}$ return to the relatively high 7 volt state.

A feature of the present invention is that charging of capacitor C3 is programmable at one of three predetermined rates. Resistor LF is of relatively large magnitude and provides a relatively slow charge rate. The second charge rate wherein capacitor C3 charges relatively more quickly is provided when resistor MF of relatively less value than LF is switched in parallel with resistor LF. The third and most rapid charge rate is implemented by switching in the HF resistor of relatively low value in parallel with resistors LF and MF.

A preferred method of implementing the above-described three charge rates so as to provide an output signal exhibiting one of three frequency rates is to provide resistor LF in series with capacitor C3 during all times. Then, upon actuation of the keyboard, to switch both resistors MF and HF into the charging circuit in parallel with LF for a predetermined relatively short period of time. This relatively short period of time during which the clock frequency is the greatest is preferably 0.4 seconds which corresponds to the time the calculator is in the actual calculating mode. After expiration of the 0.4 seconds, the HF resistor is switched out of the circuit leaving resistors LF and MF in parallel. Capacitor C3 is thus charged at the mid-charging rate in accordance with the LF + MF midimpedance value. After a second period of time, relatively longer than the first period of time, such as for example, 30 seconds, resistor MF is switched out of the charging circuit leaving resistor LF only to determine the charging rate. As noted, resistor LF is of the largest relative impedance causing the slowest rate of charge of capacitor C3. The second period of time during which the clock exhibits the middle or second highest frequency is typically referred to as the time-out period.

To implement the above sequence, transistors Q1 and Q7 are responsive to inputs from keyboard lines KN–KP. With approximately 7 volt high pulses on lines KN–KP both transistors Q1 and Q7 become conductive causing switching transistors Q4 and Q5 to become conductive and to switch resistors MF and HF into the timing circuit. When transistor Q7 is actuated, delay capacitor C5 discharges therethrough. Upon release of the keys and disappearance of the actuating pulse on lines KN–KP, transistor Q7 returns to the non-conductive state allowing delay capacitor C5 to begin to recharge. After lapse of the relatively short time interval of approximately 0.4 seconds, capacitor C5 charges to a sufficient voltage to drive switching transistor Q5 non-conductive and remove HF resistor from the circuit. Transistor Q1 likewise becomes non-conductive and concurrently with the charging of capacitor C5, capacitor C4 charges at a rate determined by resistor R10. The combination of resistor R10 and capacitor C4 is chosen such that a time of, for example, 30 seconds, is required to drive transistor Q2 once again conductive which drives switching transistor Q4 non-conductive and removes resistor MF from the charging circuit. The resistor R10-capacitor C4 combination accordingly determines the duration of the time-out period. For all other time that the calculator is actuated by the $V_{CC}$ battery, absent actuation from the keyboard via lines KN–KP, the calculator responds to the lowest frequency clock signal. A preferred lowest frequency or quiescent frequency is 3 KHz while middle frequency or displaying frequency is 30 KHz. 30 KHz is chosen so as to provide a "flicker-free" display. The relatively high frequency is preferably chosen to be approximately 200 KHz which is chosen to be compatible with the MOS circuitry yet sufficiently fast to minimize the relatively high power period required during the calculating mode.

When switching transistor Q4 becomes conductive so as to switch resistor MF into the charging circuit, the display disable circuit comprising transistors Q8-Q11 is actuated. That is, only during the period during which the clock signal exhibits the middle frequency is the display disable disenabled, or in other words, is the display enabled. A light emitting diode preferably connects terminals 305 and 306 and is actuated during the low frequency period after some 30 seconds have lapsed from keyboard actuation, to thereby indicate to the user that the calculator is in the quiescent mode.

Figure 4:
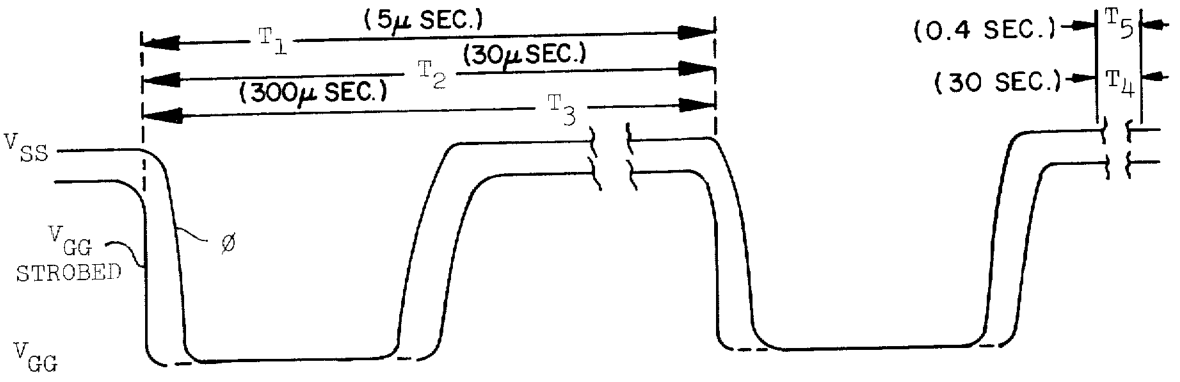
FIG. 4 are typical waveforms depicting the clock and strobed $V_{GG}$ signals generated by the bipolar chip to which the calculator chip is responsive.

Referring now to FIG. 4, the $\phi_t$ clock signal waveform and the $V_{GG}$ strobed waveform are depicted.

Times T1–T3 represent the plurality of frequencies available for the clock signal $\phi_t$ and the strobed $V_{GG}$ signal. Preferably, the waveforms remain at the low $V_{GG}$ level for approximately 2 microseconds for all frequencies. Accordingly, a 2 microseconds "on" time provides T1 approximately equal to 4–5 microseconds, representative of a relatively high frequency of 200 KHz. This represents a 50 percent duty cycle. As explained above, this frequency is utilized when the calculator is in a calculating mode for approximately 0.4 seconds, as may be represented by time T5 in the interrupted waveform.

Thereafter when the calculator goes into the displaying mode, operating approximately at 30 KHz, a 2 microseconds on time results in an approximate 30 microseconds off time or a duty cycle of 6.7 percent. The calculator operates in the displaying mode for approximately 30 seconds as may be represented by interval T4 in the interrupted waveforms of FIG. 4.

After the time out period of 30 seconds when the calculator has completed calculating and has the display disabled, the lowest frequency of 3 KHz is represented by time T3. There a 2 microsecond on time provides a 300 microseconds off time, or a duty cycle of 0.7 percent during this "quiescent" state. Both MOS calculating systems above referred to in copending patent applications assigned to the assignee of this application function to utilize a strobed $V_{GG}$ coincident with the clock signal. As nearly all transistors in the MOS/LSI calculator have loads responsive to $V_{GG}$, such as the logic gates and the PLA's, such a feature represents a near optimum dynamic power dissipating state, especially when the MOS calculator chip/chips are driven by the bipolar driver chip of this invention.

Although specific embodiments of this invention utilizing specific frequencies, duty cycles, and circuitry representing implementation of a tri-frequency clock generator which further generates a strobed $V_{GG}$ signal for an MOS calculating system has been described herein, various modifications to the details thereof will be apparent to those skilled in the art without departing from the scope of the invention.

What is claimed is:

1. In an electronic data processing system having input means for generating input data upon input actuation, processing means for manipulating the input data, output means for displaying manipulated data, and clock generator means for supplying system timing to the processing means and to the output means, the improvement wherein the clock generator means comprise means for generating a first relatively high frequency clock signal for a relatively short first time interval subsequent to data input through said input means, means for generating a second middle frequency clock signal for a longer preselected second time interval subsequent to said first time interval, and means for generating a third relatively low frequency clock signal subsequent to said second interval.

2. The data processing system according to claim 1 wherein said first time interval corresponds to the interval wherein said processing means is processing data to provide processed data, said second time interval corresponds to that period of the calculator wherein said output means is displaying said processed data, and said third time interval corresponds to a quiescent state wherein the system is retaining said processed data in internal registers without displaying it.

3. The data processing system according to claim 1 wherein said clock generator means further includes means for generating and supplying a strobed gate supply voltage to said processing means phase coincident with said clock signal.

4. The data processing system according to claim 3 and further including a regulated voltage source responsive to a DC voltage of a first magnitude for supplying a regulated voltage of magnitude greater than said first magnitude to said means for generating and supplying.

5. The data processing system according to claim 4 wherein said regulated voltage is $V_{SS}$ $V_{DD}$.

6. The data processing system according to claim 5 wherein said processing means is implemented on one MOS chip.

7. The data processing system according to claim 6 wherein said regulated voltage source comprises a switching regulator and a voltage doubler coupled thereto.

8. In an electronic calculator system comprising addressable storage means for storing fixed program instructions to control the operation of the calculator system, control means coupled to the addressable storage means and responsive to the program instructions for generating control signals in accordance with the program instructions, data register means for storing and shifting a plurality of multibit words of coded information, arithmetic-logic means coupled to the control means and to the data register means for performing arithmetic and/or logic operations on the multibit word in accordance with the control signals to provide resulting answers, input means coupled to the data register means for inputting coded information into the data register means, and output means for outputting said resulting answer, wherein said system is responsive to circuit ground, a switching regulator output voltage, and a $\phi$ clocking voltage, the method of operating said calculator system comprising the steps of:

a. generating said $\phi$ clocking voltage;

b. generating a gate supply voltage clock in direct phase relationship with said $\phi$ clocking voltage; and c. sequentially varying the frequency of said $\phi$ clocking voltage to provide a first frequency for a first time interval corresponding to the period during which the calculator is actually calculating, a second frequency during an interval of preselected duration after said first interval during which the calculator is displaying information, and a third frequency subsequent to said second interval until the calculator is de-energized, during which time the calculator is internally retaining said information in a quiescent state.

9. In an electronic data processing system implemented on at least one semiconductor chip comprising addressable storage means for storing fixed program instructions to control the operation of the data processing system, control means coupled to the addressable storage means and responsive to the program instructions for generating control signals in accordance with the program instructions, data register means for storing and shifting in a plurality of multibit words of coded information, arithmetic-logic means coupled to the control means and to the data register means for performing arithmetic and/or logic operations on the multibit words in accordance with the control signals to provide resulting data, input means coupled to the data register means for inputing coded information into the data register means, and output means for outputting said resulting data, wherein said system is operable in response to a regulated voltage, and to a $\phi$ clocking voltage, the method of operating said data processing system comprising the step of sequentially varying the frequency of said $\phi$ clock signal to provide a first relatively high frequency during a first interval corresponding to the period during which the system is actually computing, to provide a second middle frequency during a time period of a preselected duration subsequent to said first period during which the system is displaying information, and to provide a third relatively low frequency subsequent to said second interval during which the system is internally retaining said information.

10. In a miniature, battery powered, portable electronic calculator of the type having keyboard means, display means, a plurality of data registers, and arithmetic unit, and control means for effecting calculations, input of information via keyboard actuation and display of numbers via the display means, with clock generator means controlling the timing of the system, the improvement wherein said clock generator means includes means for controlling the clock rate in response to and subsequent to data input via actuation of the keyboard to provide a high clock rate during a calculation period, a lower clock rate during a period of display of results, and a very low clock rate after said period of display.

* * * * *